United States Patent [19]

Wignot

[11] Patent Number: 5,532,733
[45] Date of Patent: Jul. 2, 1996

[54] REMODULATION OF A CABLE BOX OUTPUT SIGNAL TO A UHF CHANNEL

[75] Inventor: Leroy S. Wignot, Indianapolis, Ind.

[73] Assignee: Thomson Consumer Electronics, Inc., Indianapolis, Ind.

[21] Appl. No.: 379,758

[22] Filed: Jan. 4, 1995

Related U.S. Application Data

[63] Continuation of Ser. No. 22,119, Mar. 10, 1993, abandoned.

[51] Int. Cl.[6] .................................................. H04N 7/10
[52] U.S. Cl. ........................... 348/6; 348/7; 348/11; 348/731
[58] Field of Search .......................... 348/6, 7, 10, 11, 348/731; 358/86, 191.1; 455/6.2, 303, 313; H04N 7/10, 5/50

[56] References Cited

U.S. PATENT DOCUMENTS

| | | | |
|---|---|---|---|
| 3,869,564 | 3/1975 | Colodny | 358/86 |
| 4,316,217 | 2/1982 | Rifken | 358/86 |
| 4,536,798 | 8/1985 | Reid, Jr. | 358/86 |
| 4,717,970 | 1/1988 | Long | 358/86 |

OTHER PUBLICATIONS

Pace—Service Manual—PRD 800 • PRD 900, Stereo Satellite Receiver.

*Primary Examiner*—Safet Metjahic
*Assistant Examiner*—Sherrie Hsia
*Attorney, Agent, or Firm*—Joseph S. Tripoli; Peter M. Emanuel; Thomas F. Lenihan

[57] ABSTRACT

A cable converter includes a first signal path from an RF input terminal to an RF output terminal including a tuner portion, a decoder portion, and a remodulator portion for remodulating a selected channel to an unused cable channel in the upper UHF band of cable channels in the range of cable channels 84 through 125. The subject cable converter also includes a direct parallel, second signal path from the RF input terminal to the RF output terminal. The second signal path passing all of the cable channels received at the RF input terminal to the RF output terminal substantially unimpeded.

3 Claims, 1 Drawing Sheet

5,532,733

REMODULATION OF A CABLE BOX OUTPUT SIGNAL TO A UHF CHANNEL

This is a continuation of application Ser. No. 08/022,119, filed Mar. 10, 1993, and now abandoned.

FIELD OF THE INVENTION

This invention concerns a cable box (sometimes referred to as a set-top converter, a cable converter, a cable decoder box, or an addressable converter).

BACKGROUND OF THE INVENTION

Cable boxes receive cable television signals which may be modulated onto any or all of cable channels 2 through 83, and remodulate these signals onto one of channels 2, 3, 4, or 18. In addition, cable channels 84 through 125 are provided for, but are rarely used due to high transmission line losses encountered at high UHF frequencies. In recent years, many television receivers and VCRs have been manufactured to tune both cable and "air" channels. These so-called "cable-ready" or "cable-compatible" units are able to tune through the entire 125 cable channel band. Unfortunately, in order to prevent video piracy, some so-called "premium" channels have been "scrambled" (i.e., encrypted, or encoded) by the cable operator, causing cable boxes to perform a second function, that of descrambler for premium channels.

Many viewers find it desirable to use the tuner of their cable ready television to tune nonscrambled channels directly. This is of great importance when, for example, a viewer wants to record a program from a premium channel while watching a different program on an nonscrambled channel. This can be accomplished by splitting the incoming cable ahead of the cable box and switching the input of the television receiver via a "bypass" switch to the unprocessed (i.e., "raw") cable for the nonscrambled signals, and switching the input of a VCR to the output of the cable decoder box to receive the processed descrambled premium channels. It is common to find directions for such switchable "hook-ups" in the operator's manuals for VCRs and television receivers.

It is in the best financial interest of cable operators to make maximum use of their available spectrum. Thus, in geographic areas in which the cable decoder box is set to provide an output on channel 03, it is quite common to find cable channel 03 occupied. Thus, a user having his television receiver tuned to channel 03, may be watching any cable channel remodulated to channel 03, or in fact, he may be watching cable channel 03 directly via the bypass switch. This is, to say the least, an extremely confusing situation for most nontechnical viewers.

U.S. Pat. No. 4,717,970 (Long), issued 5 Jan. 1988, describes a system which provides to subscribers processed descrambled signals remodulated onto an unused available channel, and unprocessed nonscrambled cable channels. The system of Long eliminates the need for manually-operated video signal switches by providing two parallel signal paths from a signal splitter coupled to a common RF input terminal to signal combiner coupled to a common RF output terminal. The first signal path passes all channels straight through from one output of the splitter to one input of the combiner. The second signal path passes all channels from the other output of the signal splitter to the input of a cable decoder which passes the signal of a selected channel to a modulator which modulates the output signal onto the RF carrier of an unused available channel, preferably a UHF channel. It is herein recognized that Long is not an effective solution to the problem of simplifying cable box operation because Long teaches using an unused available cable channel as the remodulation channel, which is inconsistent with the above-noted, best interest of cable television system operators (i.e., to use as much of their available spectrum as possible, preferably all of it).

SUMMARY OF THE INVENTION

It is herein recognized that the selected cable channel should be remodulated to a frequency which is unavailable, in a practical sense, to cable system operators, yet available to tuners of VCRs and television sets. Cable channels having frequencies below channel 84 are more available to the cable operator because the RF transmission lines and amplifiers required to convey them over long distances to a subscriber's home are less costly to install and maintain than are their counterparts for frequencies from channel 84 to channel 125. This is true because RF transmission line losses generally increase with increasing frequency. However, VCRs and television sets include tuners capable of tuning the entire television range from channel 2 to channel 125, and the transmission line length from the cable box to the VCR or television receiver is relatively short.

A cable converter in accordance with the subject invention includes a first signal path from an RF input terminal to an RF output terminal including a tuner portion, a decoder portion, and a remodulator portion for remodulating a selected channel to an unused cable channel in the upper UHF band of cable channels in the range of cable channels 84 through 125. The subject cable converter also includes a direct parallel, second signal path from the RF input terminal to the RF output terminal. The second signal path passing all of the cable channels received at the RF input terminal to the RF output terminal substantially unimpeded.

DETAILED DESCRIPTION OF THE DRAWING

Figure 1:
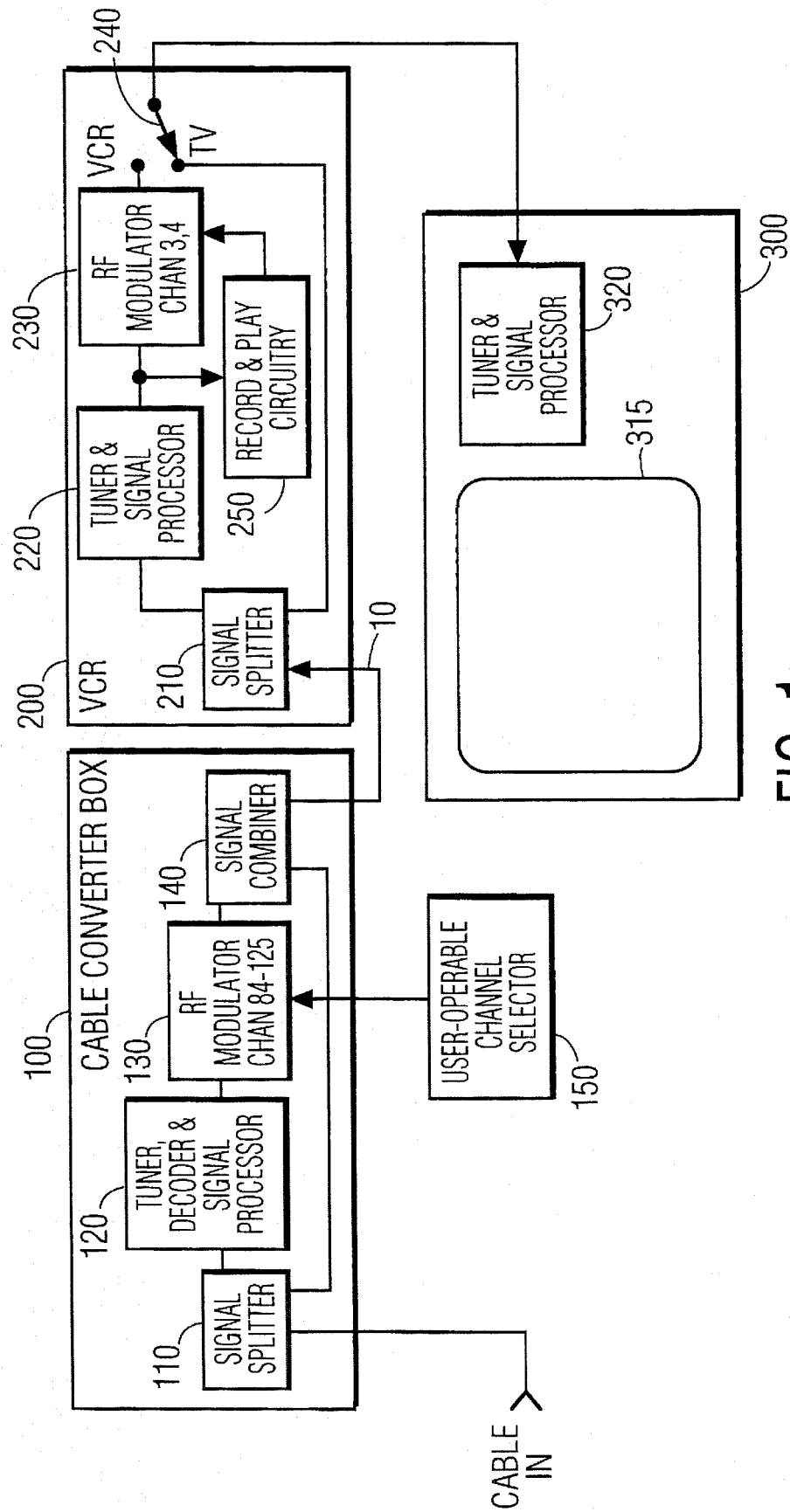
FIG. 1 (the sole FIGURE) is a simplified block diagram of an arrangement of a cable converter of the subject invention, a VCR and a television set.

Referring to FIG. 1, a cable converter box 100 includes an input terminal CABLE IN for receiving cable television signals and an output terminal at which cable television signals are developed. An RF (radio frequency) input terminal of a VCR 200 is coupled to the output terminal of cable converter 100 for receiving cable channels, and a television set 300 is coupled to an output terminal of VCR 200 for receiving television signals therefrom. Cable converter box 100 includes a first signal path from the cable input terminal to its output terminal including a first output of a signal splitter 110, a TUNER, DECODER, & SIGNAL PROCESSOR unit 120, an RF MODULATOR unit 130 for remodulating selected cable channel programs to an unused cable channel in the high UHF range (i.e., a channel in the range of cable channels 84 to 125 inclusive), and a signal combiner 140 for combining signals of the first path with signal at different frequencies from a second, parallel path. RF MODULATOR 130 may be, for example, a Plessey modulator model number SL5066. CABLE CONVERTER BOX 100 also includes a second signal path from its CABLE IN terminal to its output terminal including a second output of SIGNAL SPLITTER 110 and a second input of SIGNAL COMBINER 140. Signals of all cable channels applied to terminal CABLE IN are passed substantially unimpeded to the output of CABLE CONVERTER 100. By that, it is meant that there are no filters in the second path to inhibit any of the cable channels from passing (the second signal path has a bandwidth sufficient to pass all of the active cable channels from channel 2 through channel 83 substantially uniformly in amplitude).

As noted above, while cable channels 84 through 125 are defined and provided for, cable companies seldom actually use such extremely high UHF frequencies (i.e., approximately 585 MHz–800 MHz) due to losses in the long transmission lines between the cable company and the homes of their subscribers. Thus, CABLE CONVERTER BOX 100 is free to remodulate the decoded cable channels to a UHF channel in that range of frequencies without concern of interfering with an active cable channel. The above-mentioned transmission line losses are of no concern in the subject invention because the expected distance from the cable converter box to the VCR or television receiver is extremely short (on the order of several feet).

In operation, all cable channels in the range from channel 2 to channel 83 are conveyed from the CABLE IN terminal to the output terminal via the direct path of CABLE CONVERTER BOX 100. At SIGNAL COMBINER 140 they are combined with a signal from RF MODULATOR 130 which has been remodulated to a UHF channel in the range from channel 84 through 125, which channel is selectable by a user by means of a USER-OPERABLE CHANNEL SELECTOR unit 150. The combined RF signal is applied via a short cable 10 to the RF input terminal of a commonly-available cable-ready VCR 200. Cable 10 is preferably in the range of 1 to 6 feet in length, which is extremely short when compared to cable company RF transmission lines. VCR 200 also includes two signal paths. A first signal path includes a SIGNAL SPLITTER 210, a TUNER & SIGNAL PROCESSOR unit 220 capable of receiving all cable channels from channel 2 to channel 125, RECORD & PLAY CIRCUITRY 250, an RF MODULATOR unit for remodulating the signal to either channel 3, or 4 (as noted above, some VCRs can remodulate to other channels such as channel 18), and a TV/VCR RF switch 240. The second signal path of VCR 200 extends between a second output of SIGNAL SPLITTER 200 and a second input of TV/VCR switch 240.

In order to record a premium channel, CABLE CONVERTER BOX 110 is controlled (e.g., via a remote control unit not shown for simplicity) to select the desired scrambled premium channel, which causes that channel to be descrambled and remodulated on, for example cable channel 95. VCR 200 is then controlled (e.g., via a remote control unit also not shown for simplicity) to tune to cable channel 95 and begin recording. In order to view a different nonscrambled channel at the same time the premium channel is recording, TV/VCR switch 240 is switched to the TV position which couples all cable channels through to television set 300. Television set 300 is also of the commonly-available cable-ready type and includes a TUNER & SIGNAL PROCESSOR unit 320 which is capable of tuning all of cable channels 2–125.

It is important to note that the above-described cable decoder box does not use any of the valuable spectrum, which is available to the cable operator in any practical sense.

What is claimed is:

1. A cable converter, comprising:
   an RF television signal input terminal for receiving RF cable television signals in a first range of frequencies corresponding to cable television channels from 2 to 83 inclusive;
   a first signal path from said RF television signal input terminal to an RF television signal output terminal;
   said first signal path including at least a tuner for selecting a particular cable television channel from said cable television channels, and a remodulator portion for remodulating said selected channel to an unoccupied cable television channel in a second range of frequencies corresponding to cable television channels from cable television channel 84 to cable television channel 125 inclusive; and
   a second signal path from said RF television signal input terminal to said RF television signal output terminal;
   said second signal path having a bandwidth sufficient to pass all of the cable television channels received at said RF television signal input terminal to said RF television signal output terminal at a substantially uniform amplitude;
   said remodulator portion being controllable by a user to select said unoccupied cable television channel only from said second range of frequencies corresponding to cable television channels from cable television channel 84 to cable television channel 125 inclusive.

2. A cable television converter arrangement, comprising:
   a cable signal input terminal for receiving RF cable television signals in a first range of frequencies corresponding to cable television channels from 2 to 83 inclusive;
   a first signal path from said cable signal input terminal to an RF television signal output terminal;
   said first signal path including at least a tuner for selecting a particular cable television channel from said cable television channels, a decoder for deriving a scrambled baseband signal from a signal on said particular cable television channel and for descrambling said scrambled baseband signal, and a remodulator portion for remodulating said descrambled baseband signal to an unoccupied cable television channel in a second range of frequencies exclusive of said first range and corresponding to cable television channels from cable television channel 84 to cable television channel 125 inclusive;
   a second signal path from said cable signal input terminal to said RF television signal output terminal;
   said second signal path having a bandwidth sufficient to pass all of the cable television channels received at said cable signal input terminal to said RF television signal output terminal at a substantially uniform amplitude;
   said remodulator portion being controllable by a user to select said unoccupied cable television channel only from said second range of frequencies corresponding to cable television channels from cable television channel 84 to cable television channel 125 inclusive; and
   combining circuitry for combining signals of said first and second signal paths, and conveying said combined signals to said RF cable television signal output terminal.

3. A cable television converter arrangement, comprising:
   a cable signal input terminal for receiving RF cable television signals in a first range of frequencies corresponding to cable television channels from 2 to 83 inclusive;
   a first signal path coupled to said cable signal input terminal and including circuitry for selecting a particular cable television channel from said cable television channels and remodulating a signal derived from said particular cable television channel to a user-selected unoccupied cable television channel in a second range of frequencies exclusive of said first range and corresponding to cable television channels 84 through 125 inclusive;

a second signal path having a bandwidth sufficient to pass all of the cable television channels received at said cable signal input terminal to an RF television signal output terminal at a substantially uniform amplitude; and combining circuitry for combining signals of said first and second signal paths, and conveying said combined signals to said RF television signal output terminal.

\* \* \* \* \*